(12) United States Patent
Boissonnet

(10) Patent No.: US 6,689,542 B2
(45) Date of Patent: Feb. 10, 2004

(54) PROCESS FOR MAKING AND AN ARTICLE MARKED USING A LASER

(75) Inventor: Monique Boissonnet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 233 days.

(21) Appl. No.: 09/909,273

(22) Filed: Jul. 19, 2001

(65) Prior Publication Data

US 2002/0089092 A1 Jul. 11, 2002

Related U.S. Application Data

(63) Continuation of application No. PCT/EP00/00327, filed on Jan. 17, 2000.

(30) Foreign Application Priority Data

Jan. 20, 1999 (FR) ............................................. 99 00677

(51) Int. Cl.[7] ................................................. B41M 5/26
(52) U.S. Cl. ............................ 430/320; 430/9; 430/17; 430/18; 430/346; 156/272.8; 152/151; 264/400; 264/446; 264/482
(58) Field of Search .............................. 430/9, 17, 18, 430/945, 346, 320; 156/272.8; 264/400, 409, 446, 482; 152/151

(56) References Cited

U.S. PATENT DOCUMENTS 5,576,377 A * 11/1996 El Sayed et al. ............ 524/495
5,824,397 A * 10/1998 Koops et al. ................ 428/207

FOREIGN PATENT DOCUMENTS

| EP | 0684144 | 11/1995 |
|----|---------|---------|
| EP | 0708147 | 4/1996 |
| EP | 0827980 | 3/1998 |
| EP | 0841187 | 5/1998 |
| JP | 10-036605 A | * 2/1998 |
| WO | 9721550 | 6/1997 |

OTHER PUBLICATIONS

Witan K, "Farbige Lasermarkierungen Auf Kunststoffteilen", F & M. Feinwerktechnik Mikrotechnik Messtechnik, DE, Carl Hanse GBMH, Munchen, vol. 102, No. 10, pp. LS75–LS77, Oct. 1994.*

* cited by examiner

Primary Examiner—John A. McPherson
(74) Attorney, Agent, or Firm—Baker Botts L.L.P.

(57) ABSTRACT

A process for marking which enables a colored pattern formed by at least two different and contrasting colors to be created on a dark or black surface of a rubber article, which process includes preparing a light-colored rubber composition having at least one elastomer and at least two coloring agents of different light colors, giving the said composition its initial color, and then incorporating a dark or black masking agent into this colored composition in a limited proportion to darken or mask the initial color of the rubber composition. The process further includes causing a first laser beam of appropriate characteristics to interact in a first stage in order to reveal a first colored pattern part, followed in a second stage by a second laser beam of appropriate characteristics in order to reveal a second colored pattern part.

9 Claims, No Drawings

PROCESS FOR MAKING AND AN ARTICLE MARKED USING A LASER

This is a continuation of pending PCT/EP00/00327, filed Jan. 17, 2000.

BACKGROUND OF THE INVENTION

The invention relates to a process for marking a pattern formed by at least two contrasting colors on a black or dark surface of a rubber article, in particular a tire, the said process using a laser in pulsed operation. This invention also relates to articles based on rubber and having a colored marking created using a process for marking using a laser in pulsed operation.

To create a marking on a tire surface with a predetermined pattern in a color different from the initial color of the black surface of the said tire and which contrasts therewith, it is known, for example from U.S. Pat. No. 5,478,426, during manufacture of the black tire to position a layer of rubber of a color other than black in the vicinity of the said surface in order to cover it with a layer of black rubber and then to carry out molding and vulcanization of the said tire in a mold. In order to reveal a pattern having the color of the subjacent rubber layer, the covering layer is removed over its entire thickness and in accordance with the said pattern. Removal of the outer layer is performed by means of a laser beam.

The process of creating a colored pattern on the surface of this tire by means of a laser is regulated to eliminate a fixed and pre-selected thickness of the covering rubber. For example, in the patent U.S. Pat. No. 5,478,426 it is proposed to use as the covering rubber a formulation which is a rubber mix having a greater sensitivity to the laser radiation than the subjacent rubber mix.

However, molding of the tire is accompanied by various movements in the rubber mixes under the action of molding forces and an increase in temperature of the said mixes, which causes them to soften; these movements are moreover enhanced by molding patterns formed in relief on the outer surface of the said tire. The result of these movements, which are due to the molding operation, is that the position of the common interface between the mixes of different colors, as measured with respect to the outer surface of the tire, can vary to a greater or lesser extent. It follows that to obtain a satisfactory colored pattern, it is frequently necessary to make a plurality of passages with the laser beam: if colored zones are not visible after the first passage, a second or even a third passage is indispensable.

On the other hand, this process has an adverse effect on the surface of the tire, since part of the thickness of the surface mix is removed to a greater or lesser depth, which over time may be the source of a relatively severe local fatigue of the rubber mix.

It should be noted that this process is expensive, since it requires a plurality of rubber mixes of different colors to be positioned, and moreover it is highly energy-intensive, since there is a necessity for a greater or lesser thickness of the rubber mix to be removed. It is also apparent that creating patterns formed by at least two parts of different colors is virtually impossible to do using this process, unless the colored mixes are disposed very precisely with respect to one another.

EP patent application 0 327 508 describes a process for inscribing organic materials using a laser, which consists in incorporating into the formulation of the said materials at least one adjuvant which removes color and is photo-sensitive to laser radiation, and a compound which does not remove color and is less photo-sensitive, which fulfils the role of pigment and whereof the color is revealed in a desired pattern after exposure to the laser. The action of the laser on the photo-sensitive adjuvant which removes color brings about a fading of the color of the said adjuvant, which then reveals the color of the compound which is not sensitive to the laser.

This process, while it does not disturb the surface of the object to be marked by comparison with the previous process described, does however require the presence of at least two photo-sensitive adjuvants which remove color, such as an azo or indanthrene pigment, to create a pattern formed by at least two distinct colors. It is known that these adjuvants are very expensive: to give an order of magnitude, at the time of filing the present application these products were almost one hundred times as expensive as the fillers commonly used in the tire industry, such as carbon black.

SUMMARY OF THE INVENTION

The object of the invention is to provide a process for marking with a laser a colored pattern formed by at least two distinct colors on the surface of a rubber article which does not have the disadvantages associated with the processes which have just been mentioned and which, among other things, does not cause apparent degradation to the condition of the surface of the marked article.

The process according to the invention enables marking to be created, in particular on a surface of a tire or any article having at its surface at least one rubber composition, this marking comprising a pattern formed by at least two different colors, the said colors contrasting with the dark or black color of the initial surface of the said tire or article, without removing material visible to the naked eye (and thus without having an adverse effect on the condition of the surface). The process according to the invention does not require recourse to the use of photo-sensitive pigments which remove color.

To this end, the process for marking a pattern formed by at least two parts of different colors on a rubber article having a dark or black surface for marking comprises the following steps:

preparing a light-colored rubber composition which can be used to manufacture the article in such a way as to form at least part of the surface intended to be marked, the said composition having at least one elastomer and at least two coloring agents of different light colors giving the said composition its initial color after mixing;

incorporating into the previously obtained composition a masking agent in a quantity of less than 15 ppc (that is, 15 parts by weight per hundred parts of elastomer) to darken and/or mask the initial color of the rubber composition;

building up or molding the article having at its surface at least the dark or black rubber composition;

creating the first part of the pattern on the said surface by means of a laser supplying a pulsed beam of appropriate characteristics for interaction with the masking agent, the said pattern obtained having a light color and contrasting with the dark or black color of the adjacent surface of the article (this color substantially corresponds to the color resulting from the blend of coloring agents);

on the first part of the pattern, creating the second part of the pattern in a different color from the color of the part of the pattern obtained in the preceding step, by means of a laser supplying a pulsed beam of appropriate characteristics for interaction with one of the coloring agents present in the material after the first step.

This last operation of the process may of course be repeated to reveal other pattern parts of different colors from the first two colors obtained; all that is necessary for this is to introduce an appropriate number of coloring agents of distinct colors into the initial composition.

By a pulsed beam of appropriate characteristics for interaction either with the masking agent or with a coloring agent, there is understood here a beam obtained for example by means of a laser of the YAG type having a frequency multiplier and capable of supplying a series of pulses of pulse durations appropriate for interaction with the said masking or coloring agent in order to eliminate it selectively; these pulse durations are preferably selected to be between 300 nanoseconds and a few tens of nanoseconds.

By a coloring agent of light color, there is understood a coloring agent having a color which is essentially different from black and capable of interacting with a laser beam supplying pulses having specific characteristics as regards frequency/pulse duration/wavelength which are appropriate to extract the said agent.

By a light-colored rubber composition, there is understood in the present description a white composition or a composition colored by at least two coloring agents of light color, that is to say a composition of a color which is essentially not black. This composition may be reinforced by at least one filler which is itself white or colored, in particular silica, a composition of this kind being capable of being used in the manufacture of tires.

Preferably, for the production of tires, there is used an elastomer or "diene" rubber, that is to say in known manner an elastomer resulting at least in part (that is to say a homopolymer or copolymer) from diene monomers (monomers bearing two carbon—carbon double bonds, conjugated or otherwise).

By a masking agent, there is understood a dark or black coloring agent selected for example from the following fillers: carbon black or dark or black inorganic pigments; this masking agent has the function of modifying the initial color of the composition by darkening it or even blackening it to a greater or lesser extent depending on the percentage of masking agent used.

It has thus been discovered, surprisingly and unexpectedly, that incorporating a low and controlled quantity of black or dark masking agent into a composition having at least two distinct coloring agents, although modifying the initial color of the said composition by darkening or even totally masking it, allows a rubber composition to be obtained which can be used for the manufacture of rubber articles, such as tires, the said composition having the advantage of being capable of being marked with a laser radiation source used in pulsed operation to obtain at least one pattern formed by a plurality of different colors distinct from the dark or black color of the said composition.

Under the action of a first laser radiation, the quantity of black/dark masking agent in the rubber composition is reduced locally, which has the effect of lightening the color of the rubber composition and of obtaining a color more or less close to the initial color of the said rubber composition lacking this masking agent.

By a color more or less close to the initial color of the said rubber composition, it is understood that the color of the pattern obtained is a shade of the said initial color resulting from the blend of the different coloring agents, that is, more or less light or dark but in any case sufficiently contrasting with the dark color of the rubber mix (the result of the blend of the colors of the light coloring agents and the dark/black masking agent) to be visible to the naked eye.

Beyond a quantity of 15 ppc (that is, 15 parts by weight of masking agent per 100 parts of elastomer), it has frequently been found that it was impossible to satisfactorily reveal the initial color of the rubber composition with sufficient contrast by means of a laser beam used in pulsed operation.

Below a quantity of 0.2 ppc of masking agent, it is generally impossible to mask sufficiently the initial color of the rubber composition in such a way as to obtain by means of a pulsed laser a pattern having sufficient contrast to be visible.

The process according to the invention offers the advantage of enabling patterns having levels of reduction in the said color for each color revealed to be created at each stage, in particular by adapting the energy supplied by the laser beam, the frequency of pulsing and the speed of scanning the said beam over the surface of the article, it being understood that these different parameters can be combined appropriately.

Advantageously, the ratio by weight of all the coloring agents which are not black to the weight of the black or dark masking agent is selected as a function of the characteristics of chromatic tint, intensity and purity of the said coloring agents.

By a laser supplying a pulsed beam there is understood for example a laser functioning in pulsed or Q-switched operation. A laser beam is generated in a solid or gaseous cavity undergoing intense electrical or light excitation. The power supplied by the laser source depends among other things on its mode of operation. A distinction is made between:

continuous mode: the excitation power does not vary, the laser ray is not interrupted and the power obtained does not vary over time;

Q-switched mode: the excitation power remains constant, and the laser ray is interrupted in the cavity and stored in the active medium and is then released abruptly, giving rise to an instantaneous high-power wave.

pulsed mode: the excitation power is not continuous but is supplied in the form of pulses; pronounced energy surges allowing high powers from the laser peaks to be obtained are sent into the cavity.

Type of laser employed: YAG with frequency multiplier.

| YAG/YVO4 | double | triple | quadruple |
|---|---|---|---|
| 1064 or 1050 nm | 532 nm | 354 nm | 266 nm |

Pulse duration

| lamp pumped YAG | diode pumped YAG | diode pumped YVO4 | double YAG |
|---|---|---|---|
| 200 ns to 300 ns | 30 to 50 ns | ≦10 ns | 30 ns |

The combined action of a laser beam supplied in pulsed or Q-switched operation and appropriate characteristics of wavelength and pulse duration in the presence of a limited quantity of masking agent and/or coloring agent enables marking in at least two colors of a rubber article which is initially black or dark in color.

The invention also has as its object producing rubber articles having on their surface a colored marking created by a laser and capable of being obtained by the process having the following steps:

preparing a light-colored rubber composition which can be used to manufacture the article in such a way as to form at least part of the surface intended to be marked, the said composition having at least one elastomer and at least two coloring agents of different light colors giving the said composition its initial color after mixing;

incorporating into the previously obtained composition a dark or black masking agent in a quantity of less than 15 ppc (15 parts by weight per hundred parts of elastomer) to darken and/or mask the initial color of the rubber composition;

building up or molding the article having at its surface at least the rubber composition;

creating the first part of the pattern on the said surface of the article which is to be marked by means of a laser supplying a pulsed beam of appropriate wavelength and pulse duration for interaction with the masking agent, the said pattern obtained having substantially the color obtained from the blend of coloring agents, this color contrasting with the dark or black color of the adjacent surface of the article;

on this first part of the pattern, creating the second part of the pattern in a different color from the color of the part of the pattern obtained in the preceding step, by means of a laser supplying a pulsed beam of appropriate wavelength and pulse duration for interaction with one of the coloring agents present in the material after the first step.

The process according to the invention may be applied for the marking of a non-vulcanized article having at its surface a crude rubber composition or indeed for that of a vulcanized article having at its surface a cured rubber composition.

In order to arrive at a rubber composition having satisfactory mechanical characteristics (for example the tensile modulus), it is known to incorporate into the said composition at least one reinforcing filler. This reinforcing effect may be obtained by at least one of the coloring agents if it fulfils this function, or indeed by the addition of a complementary reinforcing filler.

In the process for marking according to the invention, increasing the frequency of the laser pulses enables the time for creating a colored pattern to be substantially reduced.

As light coloring agents there are suitable in particular all white fillers, such as silica, alumina, clays, aluminium and/or magnesium hydrates and oxides, bentonite, talc, chalk, kaolin and titanium oxide. It is remarkable that it is possible to use up to 100 ppc of titanium oxide without any incompatibility with the process according to the invention.

As light coloring agents there are also suitable colored fillers, including naturally colored fillers, or indeed those obtained by a previous coloring operation, for example silica or alumina.

To implement the invention, it is possible to use as the light coloring agent any type of coloring agent known to those skilled in the art, it being possible for this coloring agent to be organic or inorganic. By way of example there may be mentioned inorganic pigments such as metal powders, in particular those of copper or aluminium, or various metal oxides, silicates, aluminates, titanates, iron oxides or hydroxides, mixed oxides of different metallic elements such as Co, Ni, Al, Zn, organic pigments such as polycyclic pigments such as diarylide xylidides, and complexes such as copper phthalocyanines.

DESCRIPTION OF PREFERRED EMBODIMENTS

The invention and its advantages will be readily understood in the light of the description accompanying the example embodiments given below.

For all the examples given, the same rubber composition is taken as a starting point (base matrix) capable of inclusion in the manufacture of a tire and having:

100 parts of elastomers: a blend of natural rubber, polybutadiene and EPDM (ethylene propylene diene terpolymer);

40 ppc of silica as the reinforcement filler (i.e. 40 parts of silica per 100 parts of elastomer);

15 ppc of plasticizer;

1 ppc of stearic acid;

3 ppc of zinc oxide;

3 ppc of sulfur.

By N ppc there is understood N parts by weight per hundred parts of the elastomer mixture.

In a first example, first of all there is added to the base matrix:

100 ppc of titanium oxide and 20 ppc of red pigment Ciba DPP DP, which imparts a pink color to this matrix.

Then there is added:

5 ppc of carbon black N772, which fulfils the role of masking agent for the pink color and imparts an "old rose" color to the composition.

With this composition, a sheet of rubber 15×15 cm and 2.5 mm thick was molded and vulcanized (vulcanization conditions: 150° C., pressure greater than 10 bar for 25 min).

With a YAG laser (diode pumped) used in Q-switched mode at a wavelength of 1064 nm and a frequency of 500 Hz, with a lamp intensity of 12 A and a scanning rate of 100 mm/s, there is obtained in a first stage a pink pattern contrasting with the "old rose" color of the sheet.

In a second stage, the creation of the pattern is completed by the formation of a second, white, part (white tinged very slightly with pink) on the first pink part. For this there is used a YAG laser (diode pumped) at double frequency (that is to say at a wavelength of 532 nm), in Q-switched mode at a frequency of between 500 and 1800 Hz, with an intensity of between 19 and 22 A and at a scanning rate of 100 mm/s.

Adjusting the value for the frequency enables different shades of pink-tinged white to be obtained as desired.

Other example embodiments were carried out taking as a starting point the same base matrix, and comparable results were obtained by replacing the red coloring pigment by the green pigment SARMAGUM 60 D or the blue pigment Ciba microlein BCS or the yellow pigment SARMAGUM 60 A or indeed the aluminium powder Sylber Line.

Various results obtained with the same composition and different pairs of coloring pigments are summarized in a table below:

| masking agent | pigment 1 | pigment 2 | initial color | 1st pattern | 2nd pattern |
| --- | --- | --- | --- | --- | --- |
| carbon black | red BRN | green GFNP | brownish black | violet | green |
| carbon black | red BRN | blue A3R | black | violet | blue |
| carbon black | red BRN | yellow 3G | brown | orange | yellow |

The color of each marking (first and second patterns) obtained by means of the process according to the invention can be varied within a very wide range, for example in different shades of red, orange, green, yellow, blue, these being metallized or otherwise.

Advantageously, the rubber composition undergoing marking according to the process of the invention can be used to create a sheet or thin film of rubber intended to be applied permanently or otherwise, for example to an outer surface of an article, in particular a tire, in the manner of a transfer.

The use of a laser beam in pulsed operation enables any desired pattern having at least two colors contrasting with the initial dark or black color of the said sheet or film to be produced on this sheet or film.

The use of this composition in fluid form is also conceived for coating a surface of an article, in particular a tire, to be marked with a pattern of at least two colors contrasting with the dark or black color of the said composition.

Preferably, the dark or black rubber composition intended to be marked by the process according to the invention is protected against photo-oxidizing aging by incorporating into the composition a photo-stable anti-photo-oxidizing system which is non-staining with respect to this composition, for example as defined in international patent application PCT/EP 98/04150.

The process which has just been described applied to rubber compositions for tires can readily be adapted to plastics materials in general in order to obtain colored patterns having at least two colors different from the initial color of the material.

In order to protect the marking, it is furthermore possible to previously coat the rubber composition intended for marking with a layer of a translucent mix, this translucent mix being selected because it allows pulsed beams supplied by the laser to pass in order to create the marking on the subjacent composition.

I claim:

1. A process for marking a rubber article provided with at least one dark or black surface in order to create a pattern formed by at least two different colors contrasting with the article, the process comprising the following steps:

preparing a light-colored rubber composition which can be used to manufacture the article in such a way as to form at least part of the surface to be marked, the composition including at least one elastomer and at least two coloring agents of different light colors giving the composition its initial color after mixing;

incorporating into the previously obtained composition a dark or black masking agent in a quantity of less than 15 parts by weight per hundred parts of elastomer, to darken or mask the initial color of the rubber composition;

building up or molding the article having at least the dark or black rubber composition;

creating a first part of the pattern on the surface of the article which is to be marked by means of a laser supplying a pulsed beam of appropriate wavelength for interaction with the masking agent, the pattern obtained having a light color and contrasting with the dark or black color of the adjacent surface of the article, the color being substantially the same as that obtained from the blend of coloring agents; and on the first part of the pattern, creating a second part of the pattern in a different color from the color of the part of the pattern obtained in the preceding step, by means of a laser supplying a pulsed beam of appropriate wavelength for interaction with one of the coloring agents present in the material after the first step.

2. A process according to claim 1, characterized in that at least one of the light coloring agents is selected from the following fillers: silica, alumina, clays, aluminium and/or magnesium hydrates and oxides, bentonite, talc, chalk, kaolin and titanium oxide.

3. A process according to claim 1, characterized in that the coloring agents are photo-sensitive pigments having different wavelengths and being a color other than black.

4. A process according to claim 1, characterized in that the dark or black masking agent is selected from the following fillers: carbon black and dark or black inorganic pigments.

5. A process according to claim 1, characterized in that the rubber composition intended to be marked also has at least one anti-photo-oxidizing agent in order to protect and ensure the stability of the color of the pattern created on the surface of the article.

6. A process according to claim 1, characterized in that the wavelength of the laser beam is selected to be between 200 and 1064 nm.

7. A process for marking according to claim 1, characterized in that the pulse duration of the laser is selected to be between 300 nanoseconds and a few tens of nanoseconds.

8. A rubber article having on one of its surfaces a colored marking contrasting with a dark or black color of the article after vulcanization, the colored marking being produced in accordance with a process comprising the following steps:

preparing a light-colored rubber composition which can be used to manufacture the article in such a way as to form at least part of the surface to be marked, the composition having at least one elastomer and at least two coloring agents of different light colors giving the composition its initial color;

incorporating into the previously obtained composition a dark or black masking agent in a quantity of less than 15 ppc to darken and/or mask the initial color of the rubber composition;

building up or molding the article having at least the rubber composition;

creating a first part of the marking on the surface of the article which is to be marked by means of a laser supplying a pulsed beam of appropriate wavelength and pulse duration for interaction with the masking agent, the marking obtained having substantially the color obtained from the blend of coloring agents, this color contrasting with the dark or black color of the adjacent surface of the article; and on this first part of the marking, creating a second part of the marking in a different color from the color of the part of the marking obtained in the preceding step, by means of a laser supplying a pulsed beam of appropriate wavelength and pulse duration for interaction with one of the coloring agents in the material after the first step.

9. A rubber article as set forth in claim 8 wherein the article is a tire.

* * * * *